June 21, 1966   C. A. SNYDER   3,256,679
APPARATUS FOR DUST COLLECTION
Filed Jan. 14, 1963   2 Sheets-Sheet 2
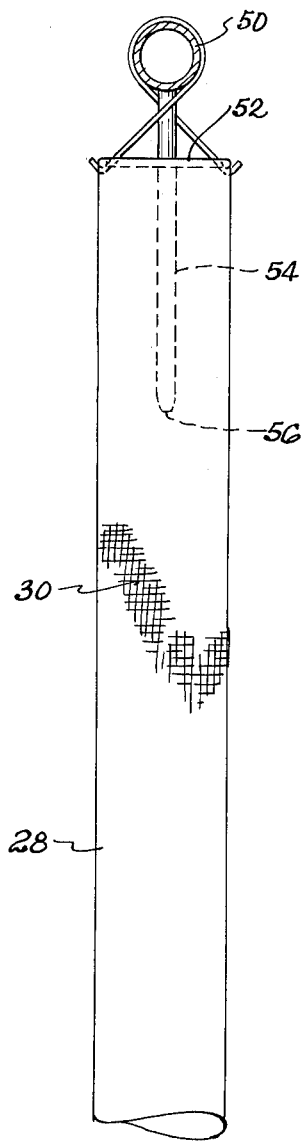
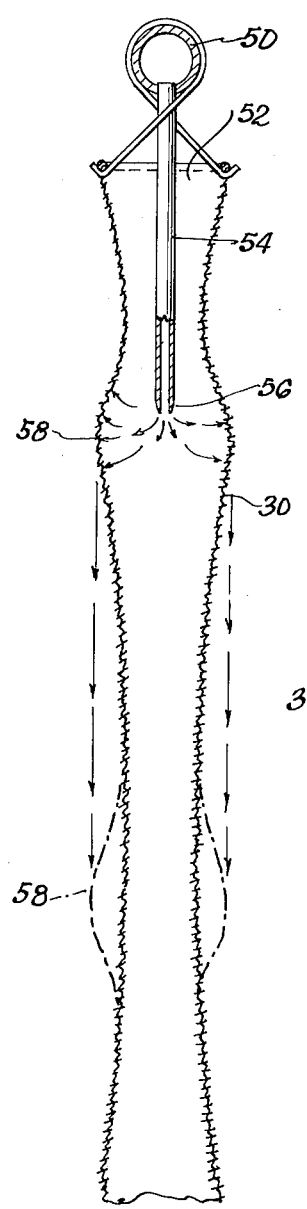
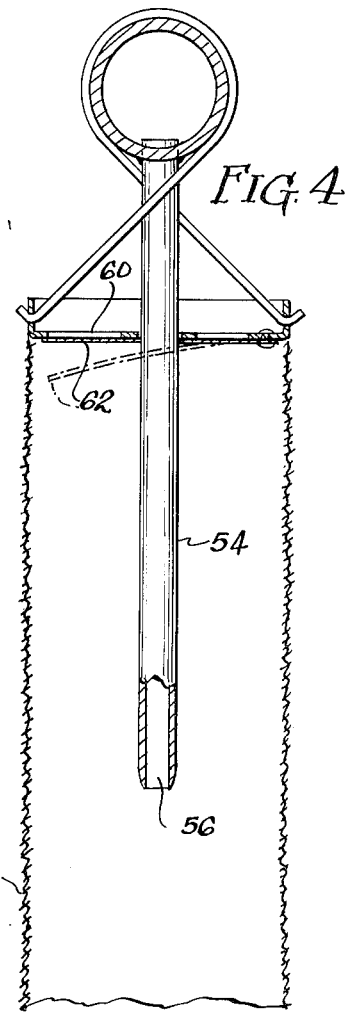
INVENTOR.
Clyde A. Snyder
BY
Ooms, McDougall and Hersh
Att'ys

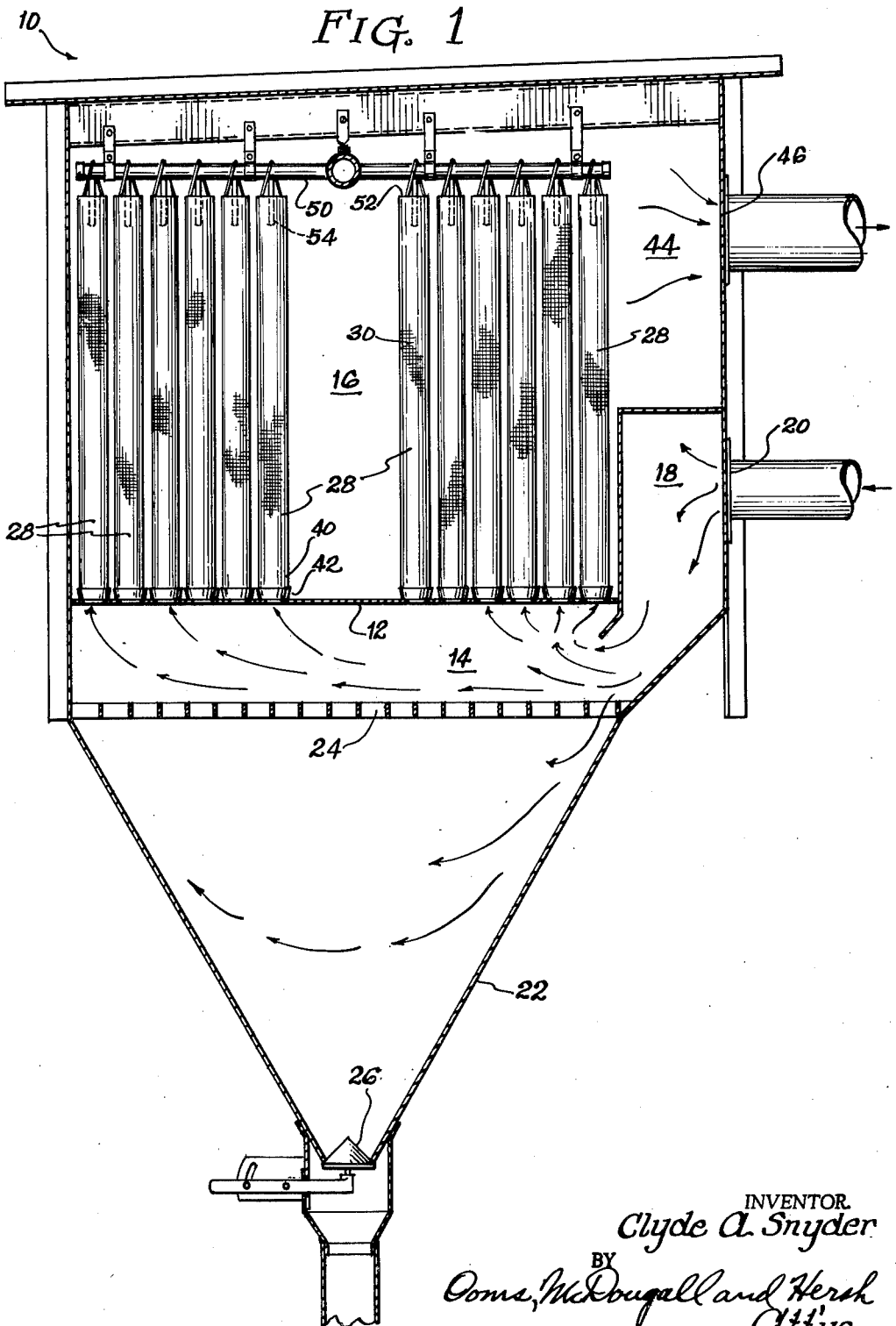

United States Patent Office 3,256,679
Patented June 21, 1966

3,256,679
APPARATUS FOR DUST COLLECTION
Clyde A. Snyder, Mishawaka, Ind., assignor, by mesne assignments, to The Wheelabrator Corporation, Mishawaka, Ind., a corporation of Delaware
Filed Jan. 14, 1963, Ser. No. 251,354
2 Claims. (Cl. 55—293)

This invention relates to a filter device for the removal of dust, dirt or other solid particles from air or other gaseous media and it relates more particularly to a dust collector which makes use of a plurality of filter elements in the form of filter bags or tubes formed of filter fabric through which the dust or dirt laden air or other gaseous media is advanced for separation of the dirt or dust particles onto the walls thereof as the air or other gaseous media passes on through.

This invention is addressed to a filter device of the type described in my previously issued Patents No. 2,143,664 and No. 2,879,863, wherein a plurality of elongate tubular members of a filter fabric are suspended from their closed upper ends on hanger rods while the open ends of the tubular members at the bottom are secured by collars to a plate having openings in communication therewith for passage of the dust or dirt laden air or other gaseous media from the inlet plenum chamber into the tubular members for filtration through the fabric.

When the accumulation of dirt or dust separated from the air or other gaseous media onto the inner walls of the filter fabric becomes so excessive as to form a filter cake which interferes with efficiency in operation of the device, it becomes necessary to clean the tubes by removing the cake of dirt or dust from the walls of the filter fabric. For this purpose, the flow of dirt or dust laden air into the inlet plenum chamber is cut off while the tubes are vigorously shaken to loosen the accumulated layers of dust and which is allowed to fall gravitationally downwardly through the open bottom end of the filter tubes and through the inlet plenum chamber into a receiver from which the collected dust and dirt can be removed from the system.

While filtering devices of the type described operate successfully for the removal of dirt, dust or other solid particles from the air stream, it has been found that the vigorous flexing action to which the fibers of the filter tube are subjected during the shaking to break up the filter cake accelerated breakage of the fibers thereby to shorten the life of the filter tube. Such accelerated fiber breakage has been found to occur substantially independently of the composition of the fibers, that is whether formed of glass, cotton, nylon, rayon, or the like, or even when such fibers are lubricated or otherwise treated as with silicone resins or lubricants.

In the attempt to prolong the life of the filter tubes, the shakers have been replaced by a repressurizing concept wherein, after the flow of the dirt or dust laden air into the filter tubes has been discontinued, the direction of air flow is reversed by the introduction of clean air under pressure into the plenum chamber on the clean side of the filter tube for flow of air in the reverse direction through the filter tube and then downwardly into the inlet plenum chamber. This causes the tensioned filter tubes to collapse inwardly to a cross-section which appears to acquire the shape of a star with rather sharp folds or bends which operates to crack the dust cake built up on the ingoing side of the filter tube. Upon cracking, the dust cake comes loose from the filter fabric and falls gravitationally into the receiver below.

Cleaning by reverse pressure, while less harmful to the fibers of the filter fabric thereby to provide for longer tube or bag life, is still somewhat objectionable from various standpoints including pressure drop across the fabric and continued breakage of the fibers.

It is an object of this invention to provide a new and improved means for the removal of the filter cake collected on the ingoing side of a fabric filter tube; in which the pressure drop across the filter fabric is less than experienced with reverse flow repressurizing for filter cake removal; which lessens the undesirable effects on the fibers of the filter fabric thereby materially to prolong the life of the filter tube; and which is effective to remove the filter cake built up on the ingoing side of the filter fabric.

These and other objects and advantages of this invention will hereinafter appear and for purposes of illustration, but not of limitation, an embodiment of the invention is shown in the accompanying drawing in which—

FIG. 1 is a schematic sectional elevational view of the interior of a filter device embodying the features of this invention;

FIG. 2 is an enlarged elevational view of a single filter tube mounted in position of use;

FIG. 3 is a sectional elevational view corresponding to that of FIG. 2 illustrating the arrangement of elements during passage of an air bubble through the tube; and FIG. 4 is a schematic sectional elevational view of an upper portion of the filter tube embodying the features of this invention showing a modification in the construction thereof.

Referring now to the drawing, the numeral 10 indicates a housing having a bottom wall 12 in the form of a cell plate which separates the housing into an equalizing inlet plenum chamber 14 and a bag house 16. The equalizing chamber 14 communicates with an inlet chamber 18 having an inlet opening 20 through which dirt or dust laden air or other gaseous media is introduced into the device. Immediately below the equalizing chamber 14 there is provided a hopper 22 separated from the equalizing chamber by an open grating 24. A passage having a removable door 26 is provided in the lower portion of the hopper for the removal of dust or dirt collected therein.

In the bag house 16 there is provided a plurality of elongate filter tubes 28 formed of a pervious filter cloth 30 woven of such material as glass fibers, cotton, rayon, nylon or the like, or mixtures thereof. The open lower ends 40 of the filter tubes are each secured by a collar 42 to the filter plate 12 with the open bottom end of the tube communicating with the opening in the filter plate for the passage of dust laden air from the equalizing chamber 14 into the interior of the filter tubes. The dirt or dust laden air which flows into the inlet plenum chamber 18 and into the equalizing chamber 14 passes upwardly into the interior of the filter tubes for separation of the dirt or dust on the ingoing side of the filter tubes as the cleaned air passes on through the pores of the fabric into the clean air plenum chamber 44 having one or more outlet openings 46 through which the clean air passes for release into the atmosphere or for other use.

The upper end portion of each of the filter tubes is suspended from a stationary support 50 to maintain the filter tubes in an extended relationship between the support at the upper end and the filter plate 12 at the lower end.

The upper end 52 of each of the filter tubes is open and extending into the open upper end of each tube is a tubular member 54 having a nozzle 56 at its lower end for the introduction of a jet of air at high pressure into the portion of the tube spaced a short distance from the upper end. Responsive to the momentary introduction of a jet of air into the tube, after the filtering cycle has been cut off by termination of flow of dust laden air into the inlet plenum chamber, an air bubble 58 forms in the interior of the tube and it travels rapidly, progressively downwardly through the length of the tube to the cell plate at the lower end. The bubble operates to cause the tube, in its semi-collapsed condition upon termination of the filtering cycle, to snap suddenly outwardly to a taut position. This sudden flexure of the fabric of the filter tube first outwardly and then back to the relaxed condition responsive to the passage of the air bubble causes the filter cake built up on the ingoing side of the filter fabric to break loose so that the built-up layer of dust and dirt is removed from the tube and falls gravitationally downwardly through the tube and into the hopper 22 for disposal. Air bubble cleaning relies on a fast snapping movement of the filter cloth from relaxed to taut position and back for the cracking and removal of the filter cake.

In practice, use can be made of a jet of air having a pressure of from 40 to 150 pounds per square inch and preferably about 70 to 100 pounds per square inch. It is sufficient to make use of a jet introduced over a period of time which may range to as much as ½ second with the jet extending downwardly from an outlet which may be located as much as six times the diameter of the tube below the open end of the tube and preferably within the distance of one tube diameter above the open end of the tube to two tube diameters below the open end of the tube. It is preferred to make use of a period of introduction of the jet of high pressure air over a period of time which is considerably less than ½ second down to a momentary blast. For cleaning purposes, use can be made of but a single jet for passage of but a single air bubble downwardly through the tube but it is preferred to provide a plurality of such jets at suitable intervals for the passage of a series of spaced air bubbles downwardly through the tube. Suitable intervals may be as great as 2 minutes between bubbles but it is preferred to make use of much smaller intervals, such as 1 to 20 seconds, to provide a type of resonance or ripple effect.

The described cleaning cycle achieved by the passage of one or more air bubbles downwardly through the filter tube is adapted to be carried out after the filter cycle has been terminated. When air bubble cleaning has been effected, the filtering cycle can be resumed.

Considerable advantage is derived from the use of tubes which are open at their upper end. Such construction enables the free flow of air into the upper end of the tube for the relief of vacuum conditions created behind the downwardly moving air bubble introduced by the jet. In the absence of such free flow of air into the open upper end of the tube to fill in the vacuum that is otherwise created behind the air bubble, such air is required to be drawn in by reverse flow through the filter tube or, in the absence of the ability freely to draw such make-up air by reverse flow through the filter fabric caked with the separated layer of dirt or dust, the formed air bubble will become dissipated more rapidly whereby it loses its effectiveness and sometimes becomes substantially completely dissipated before it has completed its travel downwardly through the length of the filter tube.

The free flow of air downwardly through the open end of the tube into the low pressure area behind the air bubble is effective also to reduce the amount of compressed air required to effect bubble formation. It is effective also to extend the life of the bubble and it is effective also to enable the filter fabric to snap from the semi-collapsed position to the taut position and back to crack or release the built-up filter cake for removal from the in-going side of the filter fabric.

The upper end of the tube can be left open during both the filter cycle as well as the cleaning cycle. When it is desired to effect closure of the upper ends of the tubes during the cleaning cycle, use can be made of a plastic or metal louver 60 dimensioned to close the open end 52 of the tube with a lined flapper valve 62 which is mounted for rocking movement responsive to the pressure conditions existing within the tube during the filtering cycle to close the valve and responsive to vacuum created behind the air bubble in the tube during the cleaning cycle to open the valve for the free flow of air into the upper end of the tube. Instead of a flapper valve of the type described, use can be made of other conventional valve means which closes in response to the initiation of the filter cycle and which opens responsive to the initiation of the cleaning cycle.

In the use of air bubbles to effect removal of the filter cake, the flexing action of the fabric making up the filter cloth is not as great nor severe as in cleaning by straight repressurizing for reverse flow. The use of the described air bubble cleaning has the further advantage of leaving more of the area within the interior of the tube free for the fall of the separated filter cake gravitationally through the tube into the hopper.

It will be understood that the concepts described may be applied to a filter system which makes use of but a single filter tube or a plurality of tubes as set forth in the foregoing description.

It will be understood further that changes may be made in the details of construction, arrangement and operation, without departing from the spirit of the invention, especially as defined in the following claims.

I claim:

1. In a dust collector which makes use of a plurality of fabric filter tubes each defining an open end into which a gas to be filtered is introduced, means mounting the tubes vertically between a support at the top and a retainer at the bottom, means communicating with the open ends of the filter tubes at the bottom for feeding in gas to be filtered, and means communicating with the open ends at the bottom for receiving the material making up the filter cake separated on the in going side of the filter fabric, the improvement comprising providing said filter tubes with an open top, means within each tube spaced a short distance from the open top for introducing a jet of air under pressure downwardly into each tube whereby the jet of air forms into an air bubble which travels downwardly through the tube to loosen the filter cake formed on the ingoing side of the filter fabric whereby the removed filter cake falls gravitationally through the tube to the receiving means and in which air is permitted freely to flow into the open upper end of the tube to fill in the vacuum behind the downwardly traveling air bubble and valve means in the upper end of the tubes for closing the upper end of the tubes during the filter cycle and for opening the upper end of the tubes when an air jet is introduced to form the air bubble.

2. A dust collector comprising a plurality of filter tubes each defining an open end into which a gas to be filtered is introduced, means mounting the tubes in a relaxed state vertically between a support at the top and a retainer at the bottom, means communicating with the open ends of the filter tubes at the bottom for feeding in gas to be filtered into the interior of the tubes, means communicating with the open ends at the bottom for receiving the material making up the filter cake separated on the ingoing side of the filter tubes, each tube being open at the top, means associated with each tube spaced a distance from the open top for injecting a jet of air under pressure downwardly into the interior of each tube and for forming an air bubble which travels downwardly through the length of the tube, the means associated with each tube, and said tube being so constructed and arranged to create a fast snapping movement of said tube to loosen the filter cake formed on the ingoing side of the filter tube whereby the removed filter cake falls gravitationally downwardly through the tube to a receiving means and in which tube air is permitted freely to flow into the open upper end of the tube to fill in the vacuum behind the downwardly traveling air bubble, said means for introducing the jet of air to form the air bubble being spaced from the upper end of the tube by an amount within one tube diameter above to two tube diameters below the open end of the tube and in which the air is introduced under a pressure of 40–150 pounds per square inch and in which the jets are introduced at intervals within the range of 1–20 seconds during the cleaning cycle.

References Cited by the Examiner

UNITED STATES PATENTS

| | | | |
|---|---|---|---|
| 2,804,168 | 8/1957 | Church | 55—302 |
| 2,954,873 | 10/1960 | Davis | 55—302 X |
| 3,073,097 | 1/1963 | Hallett et al. | 55—302 X |
| 3,178,868 | 4/1965 | Gibby | 55—302 X |

FOREIGN PATENTS

| | | |
|---|---|---|
| 649,123 | 9/1962 | Canada. |
| 853,372 | 7/1949 | Germany. |
| 1,001,465 | 1/1957 | Germany. |
| 880,043 | 10/1961 | Great Britain. |
| 914,173 | 12/1962 | Great Britain. |
| 914,187 | 12/1962 | Great Britain. |

REUBEN FRIEDMAN, *Primary Examiner.*

J. ADEE, *Assistant Examiner.*